United States Patent
Kadam

(10) Patent No.: US 12,039,444 B2
(45) Date of Patent: Jul. 16, 2024

(54) SYSTEMS AND METHODS FOR IMPROVING CONTENT RECOMMENDATIONS USING A TRAINED MODEL

(71) Applicant: Rovi Guides, Inc., San Jose, CA (US)

(72) Inventor: Lakhan Tanaji Kadam, Satara (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 18/076,939

(22) Filed: Dec. 7, 2022

(65) Prior Publication Data

US 2023/0162033 A1 May 25, 2023

Related U.S. Application Data

(63) Continuation of application No. 16/806,991, filed on Mar. 2, 2020, now Pat. No. 11,551,086.

(51) Int. Cl.
| | |
|---|---|
| *G06F 16/9535* | (2019.01) |
| *G06N 3/044* | (2023.01) |
| *G06N 3/08* | (2023.01) |

(52) U.S. Cl.
CPC .......... *G06N 3/08* (2013.01); *G06F 16/9535* (2019.01); *G06N 3/044* (2023.01)

(58) Field of Classification Search
CPC ....... H04N 21/25891; H04N 21/44204; H04N 21/251; H04N 21/44336; H04N 21/4662; H04N 21/4668; G06N 3/044; G06N 3/084; G06N 3/08; G06F 16/9535
See application file for complete search history.

(56) References Cited

U.S. PATENT DOCUMENTS

| | | | |
|---|---|---|---|
| 7,761,892 B2 | 7/2010 | Ellis et al. | |
| 8,046,801 B2 | 10/2011 | Ellis et al. | |
| 9,681,165 B1* | 6/2017 | Gupta | H04N 21/44008 |
| 9,813,784 B1 | 11/2017 | Carlson et al. | |
| 10,003,836 B2* | 6/2018 | Carmichael | H04N 21/4532 |

(Continued)

OTHER PUBLICATIONS

U.S. Appl. No. 16/806,995, filed Mar. 2, 2020, Lakhan Tanaji Kadam.

(Continued)

*Primary Examiner* — Etienne P Leroux
(74) *Attorney, Agent, or Firm* — HALEY GUILIANO LLP

(57) ABSTRACT

Systems and methods are disclosed herein for a recommendations engine that generates content recommendations using a trained model that is personalized based on the information corresponding to content consumption. The disclosed techniques herein provide a trained model to provide content recommendations. The trained model may have been trained using a predefined set of training data agnostic of a particular user profile. A system receives information corresponding to content consumption. The system may associate the information corresponding to content consumption with a profile. The system generates a personalized model based on the information corresponding to content consumption and on the trained model. The personalized model may be associated with the user profile. The system generates the content recommendations using the personalized model. The system then causes to be provided the content recommendations.

18 Claims, 13 Drawing Sheets

(56) References Cited

U.S. PATENT DOCUMENTS

| | | | |
|---|---|---|---|
| 10,678,801 B2* | 6/2020 | Suslov | H04N 21/4828 |
| 10,949,432 B1 | 3/2021 | Grayson | |
| 10,986,408 B1* | 4/2021 | Randhawa | H04N 21/4668 |
| 11,126,785 B1* | 9/2021 | Nassif | G06Q 30/0244 |
| 11,200,492 B1 | 12/2021 | Dai et al. | |
| 2004/0261095 A1 | 12/2004 | Sezan et al. | |
| 2005/0251827 A1 | 11/2005 | Ellis et al. | |
| 2010/0138865 A1 | 6/2010 | Rai et al. | |
| 2014/0281973 A1 | 9/2014 | Klappert et al. | |
| 2014/0325552 A1 | 10/2014 | Evans et al. | |
| 2015/0172748 A1 | 6/2015 | Navarro | |
| 2016/0080444 A1 | 3/2016 | Freeman et al. | |
| 2016/0316238 A1 | 10/2016 | Carmichael et al. | |
| 2017/0214748 A1* | 7/2017 | Granqvist | H04W 76/14 |
| 2017/0221007 A1* | 8/2017 | Tang | G06N 20/00 |
| 2017/0235849 A1 | 8/2017 | Jacob | |
| 2018/0203583 A1 | 7/2018 | Achtner et al. | |
| 2019/0356937 A1 | 11/2019 | Huang et al. | |
| 2020/0074006 A1* | 3/2020 | Ram | H04L 67/02 |
| 2020/0199671 A1* | 6/2020 | Pan | G06N 20/00 |
| 2021/0252340 A1* | 8/2021 | Smith | A63B 24/0006 |
| 2021/0271967 A1 | 9/2021 | Kadam | |
| 2021/0274256 A1 | 9/2021 | Kadam | |
| 2022/0210498 A1* | 6/2022 | Walker | G06F 3/0641 |

OTHER PUBLICATIONS

International Search Report and Written Opinion in PCT/US2020/066409 dated Feb. 23, 2021.

* cited by examiner

SYSTEMS AND METHODS FOR IMPROVING CONTENT RECOMMENDATIONS USING A TRAINED MODEL

CROSS-REFERENCE TO RELATED APPLICATIONS

This application is a continuation of U.S. patent application Ser. No. 16/806,991, filed Mar. 2, 2020, the disclosure of which is hereby incorporated by reference herein in its entirety.

BACKGROUND

The present disclosure is directed to systems and methods for providing media content recommendations, and in particular, for providing improved recommendations using a trained model.

SUMMARY

Media content recommendations are used to improve the user experience when browsing for content. For example, media content recommendations have helped users find content in which the users may be interested in consuming. Media content recommendation systems may provide content recommendations to a user which is similar to previously consumed content by the user. Additionally or alternatively, recommendation systems may provide content recommendations to a user based on content consumed by users who have similar interests as the user.

User preferences may change based on one or more factors corresponding to consuming content. For example, a user may prefer watching a relaxing movie during the evening of a weekday. The user may also prefer watching an action movie during the afternoon of a weekend. Conventional recommendation systems do not adapt to changing user preferences.

Content may have portions of interest to a user. For example, a user may have liked a particular scene in an episode of a series. The user may have watched the particular scene multiple times. The user may also skip other scenes in the episode to watch the particular scene. Conventional media recommendation systems may provide content recommendations similar to the consumed content, which may still include scenes that the user prefers to skip. In such a case, the user has to filter through the recommended content for the portions of interest, which can be an arduous process.

To address these shortcomings, systems and methods are described herein for a recommendations engine that generates content recommendations using a trained model that is personalized to information corresponding to content consumption.

It should be noted that a media guidance application may include or be a recommendations engine described herein. It should be noted that media guidance data described herein may include or be information corresponding to content consumption that a recommendations engine may use in the various techniques described in the present disclosure.

A trained model for generating content recommendations is provided. The trained model may have been trained using a predefined set of training data. The predefined set of training data may be agnostic of profile data. For example, the trained model may have been trained without bias to the preferences of a particular user.

The system may receive information corresponding to content consumption. The information corresponding to content consumption may also be referred to, herein, as content consumption data. In some embodiments, the information may include information about user activity corresponding to content consumption (i.e. user activity data). In some embodiments, the information may include content metadata. Content metadata may indicate time, location, content type, and/or content genre of consumed content. In some embodiments, the information may include control activity data. Control activity data may indicate one or more control function selections made by a user while consuming content. For example, the activity data may indicate that a user enjoys listening to music associated with Game of Thrones during a weekend night at home. In some embodiments, the information may include information corresponding to portions of consumed content. For example, the activity data may include skipped scenes or repeated watching of a scene in Game of Thrones. In some embodiments, the information corresponding to content consumption may be associated with a profile. For example, a user may have watched and enjoyed an action scene in a series such as Game of Thrones. The corresponding activity indicating enjoyment of watching the action scene may be received by the system and saved in a profile.

An updated model may be generated based on the information corresponding to content consumption and on the provided model. The updated model may also be referred to, herein, as a personalized model, which is refined based on the information corresponding to content consumption. For example, a trained model may not have been trained indicating that a user likes Game of Thrones. A personalized model may be generated by updating the trained model with content consumption data from when a user watched Game of Thrones. In some embodiments, the personalized model may be a first updated model. In some embodiments, the personalized model may be associated with a profile. For example, the personalized model is linked to a profile and the associated activity.

The system may generate content recommendations using the personalized model. For example, the personalized model may be used to output recommendations similar to Game of Thrones such as Lord of the Rings. The content recommendations may include previously consumed and unconsumed content. For example, the recommendations may be provided at a time when a user may enjoy consuming the content. For example, a user may have watched Game of Thrones over a year ago. The system, using the personalized model, may determine the user might enjoy rewatching Game of Thrones after a year based on the activity data. The personalized model may be used to generate Game of Thrones for recommendation based on that determination.

The system may cause to be provided the content recommendations to a user. For example, the recommendation, Lord of the Rings, may be provided and displayed on a user device. In some embodiments, the content recommendations may be a first set of content recommendations.

In some embodiments, the system may receive additional information corresponding to content consumption. In some embodiments, the additional information may include activity corresponding to content recommendations provided by the system. Additionally or alternatively, the additional information may include activity corresponding to other consumed content recommendations. A second updated model may be generated based on the additional information and on the first updated model. In some embodiments, the second updated model is the personalized model which is updated using the additional information corresponding to content consumption. For example, a user may watch the recommendation, Lord of the Rings, and another content item such as House of Cards. The system receives related activity data and the personalized model may be updated to include the related activity data. The second updated model may be referred to as a second personalized model. The personalized model may be updated any number of times and based on any suitable trigger (e.g., periodically, by user request, when the system determines that particular previously unknown preferences of the user are significant enough, etc.). The personalized model may be referred to, herein, as a first, second, third, etc. updated personalized model (or personalized model for the sake of brevity) based on the number of times the personalized model has been updated.

In some embodiments, the second updated model may be used to generate additional content recommendations. For example, the system may use the second personalized model to generate recommendations similar to any one or more content item consumed in the content consumption data. The additional content recommendations may be a second set of content recommendations. The system may cause to be provided the second content recommendations.

In some embodiments, generating the content recommendations may include generating recommendations of portions of content items. For example, the content consumption data may have indicated that a user prefers action scenes in Game of Thrones. The personalized model may be used to generate, for example, scenes similar to the action scenes in Game of Thrones. In another example, the personalized model may be used to generate music similar to action scenes from Game of Thrones.

In some embodiments, the content recommendations may correspond to a preferred content genre and/or a preferred subject. For example, content consumption data may indicate a user likes a specific actor such as Kit Harington and/or thrilling scenes such as a flight on the back of a dragon. The system may generate content recommendations which, for example, include Kit Harington and/or thrilling flight scenes.

In some embodiments, the information corresponding to content consumption may indicate preferred content genres. In such embodiments, the system may rank the content genres based on the content consumption data and generate a genre ranking. The personalized model may be generated based on the genre ranking. The system may use the updated model to generate content recommendations which are ordered based on the ranked themes.

In some embodiments, generating a personalized model based on the trained model and the content consumption data may include generating a model using a recurrent neural network. For example, the recurrent neural network may be a long short-term memory recurrent neural network (LSTM RNN). Generating the model using the recurrent neural network may include determining and updating state data associated with a trained model and content consumption data. Generating the model using the recurrent neural network may include updating weights associated with content based on the model and the state data. The states associated with a model may be determined and updated iteratively based on the weights. The weights may be optimized based on the state data and the model. The personalized model may be generated based on the weights and the state data.

In some embodiments, the system may determine consumed portions of content associated with content consumption data. The activity data of the consumed portions may be indicative of a preferred length and/or content theme. The personalized model may be used to generate recommendations of portions corresponding to the preferred theme. The recommended portions may be modified to be the preferred length. For example, a user may have repeatedly watched an action scene from Game of Thrones. The action scene may have been seven minutes and the user may have skipped the first two minutes of the scene. Action scenes of content may be generated and adjusted, for example, to a length of five minutes. The system may provide the adjusted scenes to a device.

In some embodiments, the information corresponding to content consumption may include activity data associated with a social network. For example, a user may have indicated liking a specific episode of Game of Thrones on a social media network such as Twitter. The system may receive related activity data and generate an updated model that is based on the related activity data.

In some embodiments, a trained model may be provided that has been updated based on information about content consumption associated with a profile. The information about content consumption may include information about consumption of portions of content items. A system may generate content recommendations using the trained model. In some embodiments, the system may generate content portion recommendations based on content recommendations and on information about consumption of portions of content items. The system may provide the content portion recommendations. For example, Lord of the Rings may be recommended using any of the models described in the present disclosure based on content consumption data. A system may generate and provide scene recommendations from Lord of the Rings and/or a similar series like Game of Thrones based on the content consumption data.

In some embodiments, a system may determine a portion of a content item is preferred based on information about content consumption. For example, a system may determine a scene of Lord of the Rings is preferred if a user repeatedly watches the scene. A portion may be preferred based on a consumption preference associated with a profile. A consumption preference may include content genres and/or content lengths. A system may generate content portion recommendations based on the preferred portion. Additionally or alternatively, a system may determine a portion of a content item is not preferred based on information about content consumption. For example, a system may determine a scene of House of Cards is not preferred if a user skips the scene. A system may generate content portion recommendations based on the portion that is not preferred. In some embodiments, the content recommendations and/or content portion modifications may be generated as modified portions of content items based on a preferred portion and/or a nonpreferred portion.

In some embodiments, a system may determine a preferred content genre based on the information about content consumption. The system may generate content recommendations and/or content portion recommendations based on the preferred genre. Additionally or alternatively, a system may determine a preferred content item length based on the information about content consumption. The system may generate content recommendations and/or content portion recommendations based on the preferred content item length. For example, a user may prefer to watch a final battle scene in Lord of the Rings. The user may have indicated preferring to watch an abridged final battle scene in Lord of the Rings without dialogue mixed into the battle scene by skipping past some or all of the dialogue. The system may generate a battle scene recommendation with little dialogue in Lord of the Rings or other recommended content. The system may determine a preferred scene length of five minutes from the final battle scene based on the skipping. The system may generate scene recommendations of around five minutes.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for a recommendations engine that generates content recommendations using a trained model that is personalized to information corresponding to content consumption.

It should be noted that a media guidance application may include or be a recommendations engine described herein. It should be noted that media guidance data described herein may include or be information corresponding to content consumption that a recommendations engine may use in the various techniques described in the present disclosure.

As referred to herein, the term "content" should be understood to mean an electronically consumable asset accessed using any suitable electronic platform, such as broadcast television programming, pay-per-view programs, on-demand programs (as in video-on-demand (VOD) systems), Internet content (e.g., streaming content, downloadable content, Webcasts, etc.), video clips, audio, information about content, images, animations, documents, playlists, websites and webpages, articles, books, electronic books, blogs, chat sessions, social media, software applications, games, virtual reality media, augmented reality media, and/or any other media or multimedia and/or any combination thereof.

Figure 1:
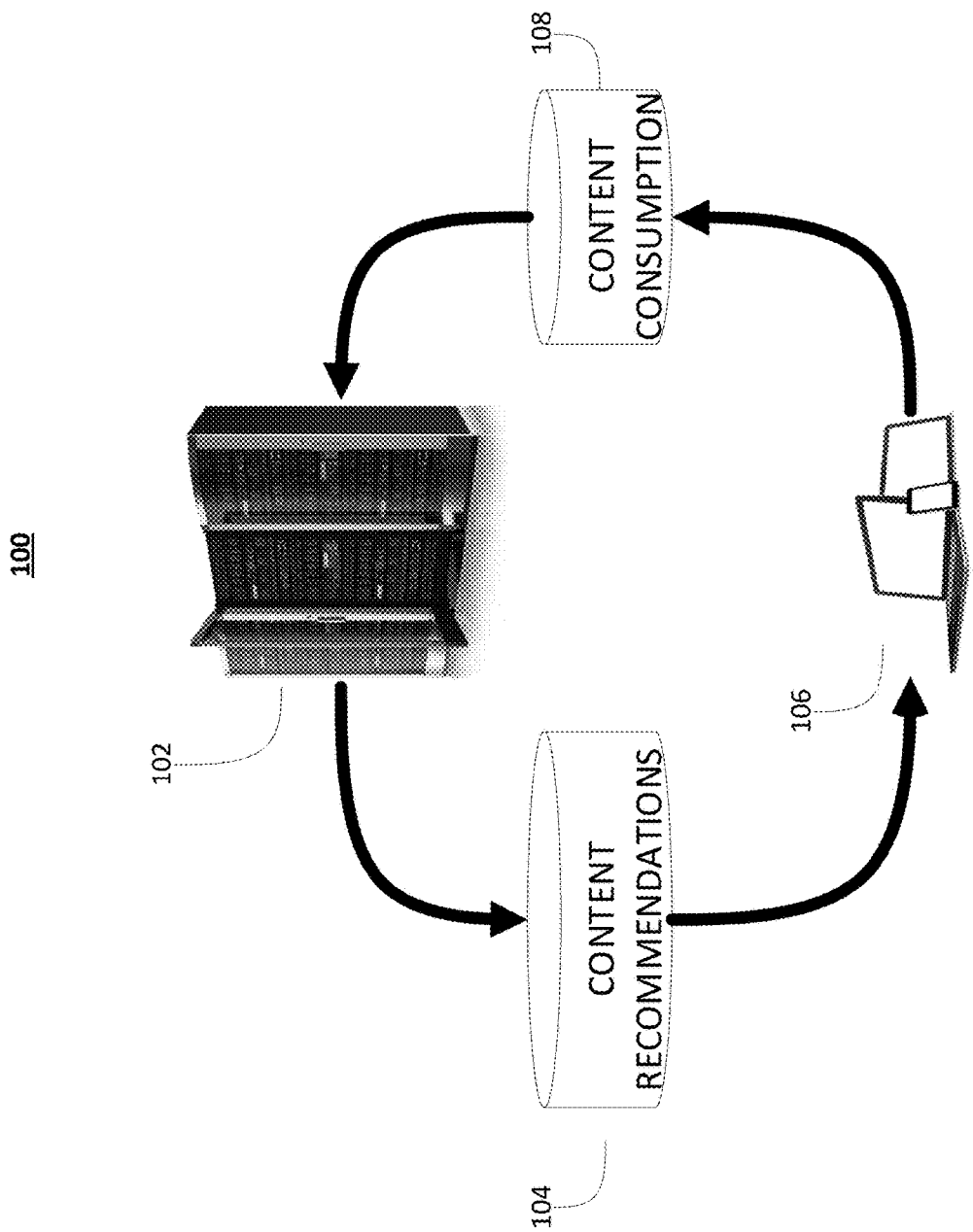
FIG. 1 shows an illustrative flow diagram in a system providing content recommendations and improving recommendations based on content consumption data, in accordance with some embodiments of the disclosure.

FIG. 1 shows an illustrative flow diagram in a system providing content recommendations and improving recommendations based on content consumption data, in accordance with some embodiments of the disclosure. System 100 includes recommendations engine 102. Recommendations engine 102 may provide content recommendations 104 to user equipment 106. Information corresponding to consumed content (i.e. content consumption data 108) may be collected and provided to recommendations engine 102, which may generate additional content recommendations based on content consumption data 108. System 100 may perform the described steps in a loop to improve provided content recommendations 104 using new content consumption data 108. System 100 may improve content recommendations 104 and filter points of interest based on content consumption data 108 by using a trained model (e.g. a long short-term memory recurrent neural network (LSTM RNN) model).

In some embodiments, the trained model may be a long short-term memory recurrent neural network model. The advantage of LSTM RNN over other neural networks in regards to the present disclosure is that a LSTM RNN can learn from content consumption data which was not available when first training a model for providing content recommendations. The LSTM RNN provides the advantage of including past and new content consumption data in a LSTM RNN model while concurrently using the LSTM RNN model to provide content recommendations. System 100 saves all the content consumption data corresponding to content consumption. The content consumption data may include fully watched content or portions of content. The portions of content may be indicative of points of interest. The LSTM RNN may be trained in a supervised fashion on a set of training sequences (i.e. training data) by using machine learning techniques (e.g. gradient descent and backpropagation through the content consumption data). The described optimization may compute gradients to change one or more weights of the LSTM RNN model. Unnecessary or wrong recommendations, which indicate errors in the weights, may be looped in a feedback loop using machine learning techniques (e.g. gradient descent and backpropagation) through the LSTM RNN to generate one or more optimized weights.

Content recommendations and portions of content recommendations may be generated using recommendations engine 102. Again, this output will be back propagated in the LSTM RNN network to further improve recommendations and better recommendation of points of interest in the content. For example, a user may watch all seasons of a series, such as Game of Thrones. Game of Thrones includes multiple content themes and genres such as witty humor, fights, suspense, thriller, romance, pity, revenge, surprise, etc. For example, an episode in the series might be watched fully or partially. The episode may include scenes of particular interest to a user and may be watched multiple times. Some episodes may be watched only once fully or only partially. For example, a user may have enjoyed playing action games. For example, a user may enjoy reading e-books. Content consumption data 108 may include such example activities and may be used to train and/or update a model (e.g. a LSTM RNN model). The model may include data about the scenes of interest from an episode based on content consumption data. Additionally or alternatively, the model may include data about scenes of disinterest based on content consumption data. System 100 may generate new content recommendations based on preferences using the model. In some embodiments, portions (e.g. scenes) of interest may be recommended which may be filtered content from previously consumed content. That filtered content may be sorted and/or ranked based on a variety of criteria (e.g. by preferred content themes and/or genres based on content consumption data 108) and may be recommended. New content consumption data (e.g. content consumption data 108) based on content recommendations 104 may be provided to the LSTM RNN model, which may improve future content recommendations 104.

Portions of content recommendations may be consumed. In a non-limiting example, a scene from recommended content is of length seven minutes. A user may watch the first five mins and then skip the last two mins. Content consumption data 108 may include that information and the LSTM RNN model may be updated based on the information. In another non-limiting example, a user may watch provided content recommendations 104 fully or may only watch portions of interest. Content consumption data 108 may also include that information and the LSTM RNN model may be further updated based on the information. The LSTM RNN model is further described in relation to FIG. 11.

Figure 2:
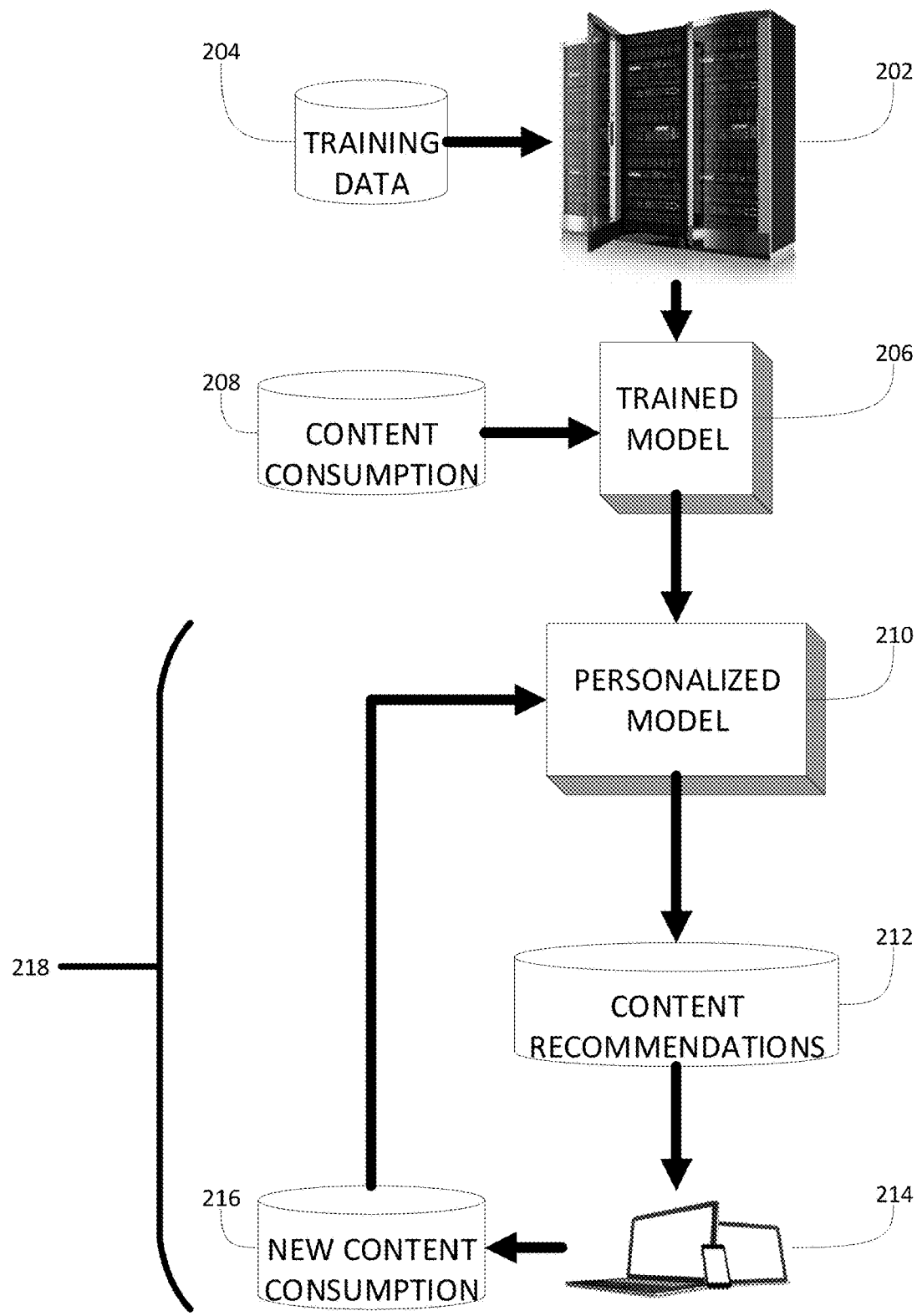
FIG. 2 shows an illustrative block diagram of a system using a trained model to generate content recommendations and repeatedly updating the model based on activity data, in accordance with some embodiments of the disclosure.

FIG. 2 shows an illustrative block diagram of a system 200 using a model to generate content recommendations and continually update the model based on new content consumption data to generate improved content recommendations, in accordance with some embodiments of the disclosure. System 200 includes recommendations engine 202. System 200 may receive training data 204 via recommendations engine 202. In some embodiments, training data 204 may be a predefined set of training data that is agnostic of a particular profile. Recommendations engine 202 may provide a trained model 206 based on training data 204. Trained model 206 may be combined with information corresponding to content consumption (i.e. content consumption data 208) to generate an updated or personalized model 210. Content consumption data 208 may include activity data corresponding to content consumption of a specific profile. Personalized model 210 may be personalized to a specific profile based on content consumption data 208. Personalized model 210 may be generated by recommendations engine 202. For example, a trained model may not have been trained indicating that a user likes Game of Thrones. A personalized model may be generated by updating the trained model with content consumption data from when a user watched Game of Thrones. In some embodiments, the personalized model may be a first updated model. In some embodiments, the personalized model may be associated with a profile. For example, the personalized model is linked to a user profile and the associated activity. For example, the personalized model is linked to a gaming profile. For example, the personalized model is linked to a reading profile.

In some embodiments, the information may include content metadata. Content metadata may indicate time, location, content type, and/or content genre of consumed content. The information may also include control activity data. Control activity data may indicate one or more control function selections made while consuming content. For example, the activity data may indicate that a user enjoys listening to music associated with Game of Thrones during a weekend night at home. In some embodiments, the information may include information corresponding to portions of consumed content. For example, the activity data may include skipped scenes or repeated watching of a scene in Game of Thrones. For example, the activity data may include finishing the same game multiple times. For example, the activity data may include activity related to virtual reality content. In some embodiments, the information corresponding to content consumption may be associated with a profile. For example, a user may have watched and enjoyed an action scene in a series such as Game of Thrones. The corresponding activity indicating enjoyment of watching the action scene may be received by the system and saved in the user's profile.

Personalized model 210 may be used to generate content recommendations 212. Content recommendations 212 may be provided to user equipment 214 using, as non-limiting examples, input/output circuitry, communications circuitry, and/or a communications network. New content consumption data 216 corresponding to content consumption may be collected and received by system 200. Content consumption data 216 may include activity data corresponding to consumption of content recommendations 212. Content consumption data 216 may include activity data corresponding to consumption of other content. Personalized model 210 may be updated using new activity data 216. The updated personalized model 210 may be used to generate more content recommendations 212. System 200 may update personalized model 210 using new content consumption data 216 and generate more content recommendations 212 in a continuous loop 218.

Content recommendations 212 may include previously consumed and unconsumed content. Recommendations 212 may be provided at a time when consumption data 208 may be indicative of enjoyment of consuming the content. System 200 may determine a period of time after which consumption of previously consumed content may preferred. For example, a user may have watched Game of Thrones over a year ago. System 200, based on content consumption data 208 or new content consumption data 216, may determine the user might enjoy rewatching Game of Thrones after a year based on the activity data. Personalized model 210 may be used to generate Game of Thrones for recommendation in response to the determining. The system may cause to be provided the content recommendations. For example, a content recommendation, such as Lord of the Rings, may be provided and displayed on a device. In some embodiments, the content recommendations may be a first set of content recommendations (e.g. as part of loop 218). For example, personalized model 210 may be used to generate a game related to Game of Thrones. For example, personalized model 210 may be used to generate VR content related to Game of Thrones.

Figure 3:
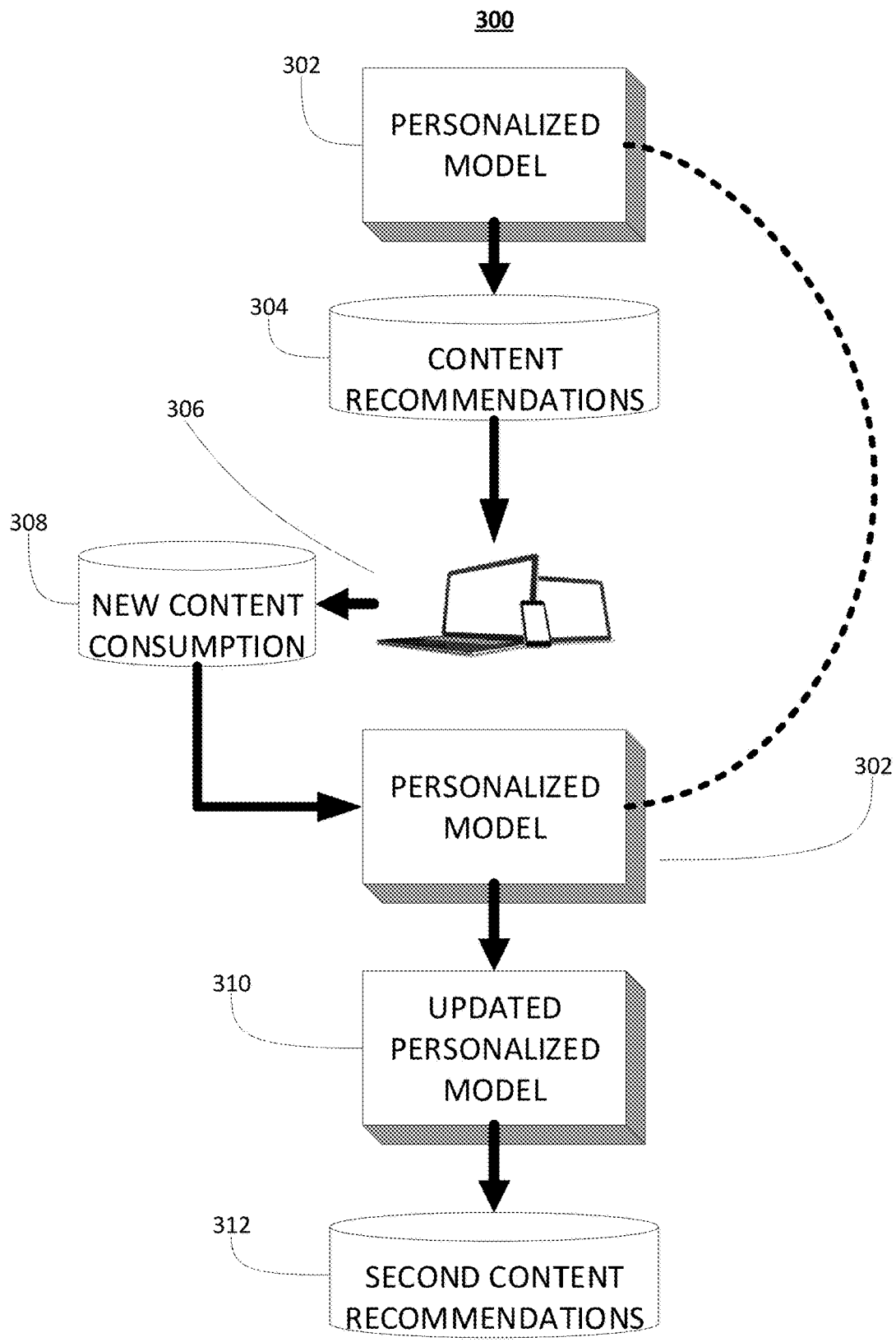
FIG. 3 shows an illustrative block diagram of a system providing recommendations and updating a personalized model based on activity data for the provided recommendations, in accordance with some embodiments of the disclosure.

FIG. 3 shows an illustrative block diagram of a system 300 providing recommendations and updating a personalized model based on activity data for the provided recommendations, in accordance with some embodiments of the disclosure. System 300 may include personalized model 302. For example, personalized model 302 can be personalized model 210. Personalized model 302 may be used to provide a first set of content recommendations 304 to user equipment 306. System 300 may receive additional information corresponding to content consumption. For example, new content consumption data 308 may be collected and transmitted. In some embodiments, content consumption data 308 may be activity data corresponding to consumption of recommendations 304. In some embodiments, the additional information may include activity corresponding to content recommendations provided by the system. Additionally or alternatively, the additional information may include activity corresponding to other content recommendations consumed by a user. Personalized model 302 and activity data 308 may be used to generate an updated personalized model 308. Updated personalized model 310 may be a second updated model. For example, recommendations engine 202 may generate updated model 310. Updated model 308 may be used to generate a second set of content recommendations 310. In some embodiments, system 300 may be considered a single occurrence of loop 218 containing model 210, recommendations 212, device 214, and content consumption data 216. For example, updated personalized model 310 can be updated personalized model 210 after loop 218. For example, a user may watch the recommendation, Lord of the Rings, and another content item such as House of Cards. The system receives related activity data and the personalized model may be updated to include the related activity data. The second updated model may be referred to as a second personalized model.

In some embodiments, the second updated model may be used to generate additional content recommendations. For example, the system may use the second personalized model to generate recommendations similar to any content item in the content consumption data. The additional content recommendations may be a second set of content recommendations. The system may cause to be provided the second content recommendations.

In some embodiments, generating the content recommendations may include generating recommendations of portions of content items. For example, the content consumption data may have indicated that the user prefers action scenes in Game of Thrones. The personalized model may be used to generate, for example, scenes similar to the action scenes in Game of Thrones. In another example, the personalized model may be used to generate music similar to action scenes from Game of Thrones.

Figure 4:
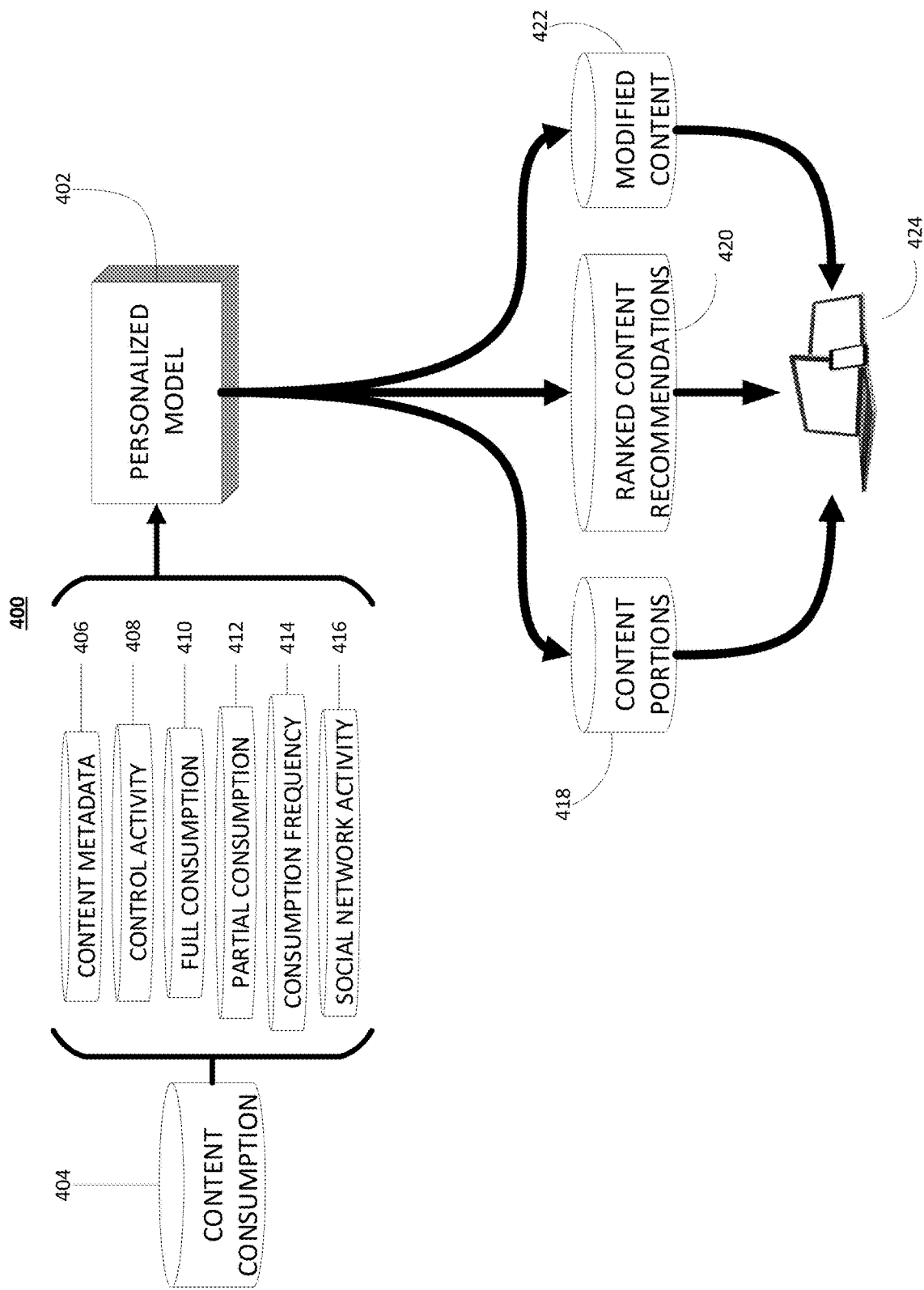
FIG. 4 shows an illustrative block diagram of a system using a model along with various types of activity data to generate various content recommendations, in accordance with some embodiments of the disclosure.

FIG. 4 shows an illustrative block diagram of a system 400 using a model along with various types of activity data to generate various content recommendations, in accordance with some embodiments of the disclosure. System 400 may include personalized model 402. Content consumption data 404 shows exemplary categories of activity data that may be used with personalized model 402 to generate content recommendations. Content consumption data 404 may include content metadata 406 and control activity data 408. Content consumption data may also include data indicating fully consumed content 410, partially consumed content 412, or consumption frequency of content 414. Content consumption data may also include activity data 416 indicating activity on a social network. It should be noted that data 406-416 are shown separately for clarity and that content consumption data 404 may include any one, any combination, or all of data 406-416. Content consumption data 404 may be a mix of any of data 406-416 and appropriate techniques to organize content consumption data 404 may be involved as part of the systems and methods described in the present disclosure. System 400 may generate content recommendations using personalized model 402 and content consumption data 404. The content recommendations may include recommended portions of content 418. The content recommendations may include ranked content recommendations 420 based on a generated genre ranking. The content recommendations may include modified content 422. Modified content 422 may be modified based on the content consumption data. For example, out of a seven minute length scene from an episode of Game of Thrones, a user may only watch starting from the third minute to the seventh minute of the scene. The system may determine that the user prefers to watch the four minute length part of the scene. When generating the recommended content, the system may modify the length of the content or recommended portions of the content based on the four minute part of the scene. It should be noted that recommendations data 418-422 are shown separately for clarity and may be included in or be a single entity (e.g. content recommendations 212). The system may cause to provide the generated content recommendations to exemplary user equipment 424.

Figure 5:
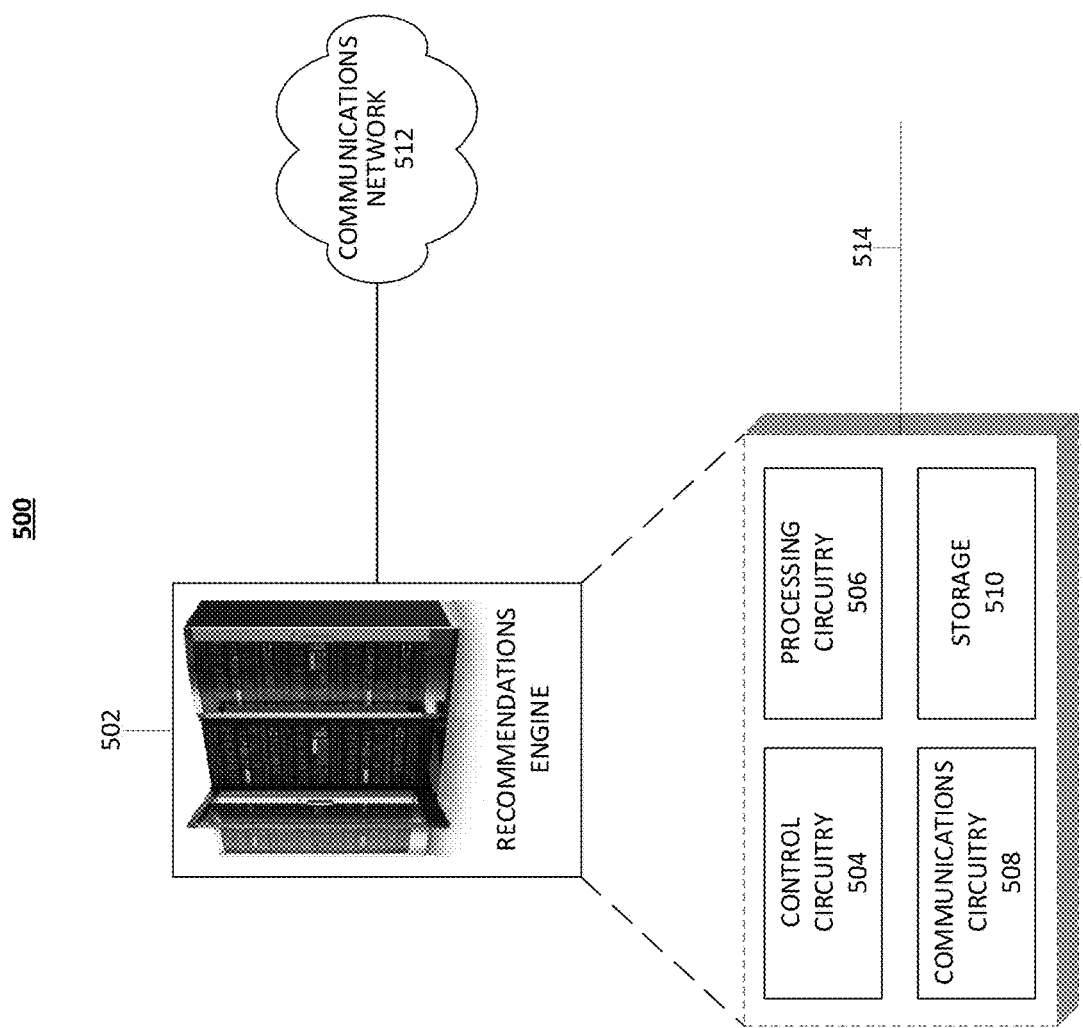
FIG. 5 shows an illustrative block diagram of a system including a recommendations engine and communications network, in accordance with some embodiments of the disclosure.

FIG. 5 shows an illustrative block diagram of a system 500 to generate and provide content recommendations, in accordance to some embodiments of the disclosure. System 500 may include recommendations engine 502 and communications network 512. In some embodiments, the recommendations engine may be communicatively connected to a user interface. Recommendations engine 502 may include control circuitry 504, processing circuitry 506, communications circuitry 508, and storage 510 (e.g., RAM, ROM, hard disk, removable disk, etc.) with corresponding storage circuitry. Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some embodiments, control circuitry 504 executes instructions for a recommendations engine stored in memory (e.g., storage 510). In some embodiments, recommendations engine 502 may be (or included in) a cloud entertainment service system (e.g. a cloud gaming console). A cloud entertainment service system may substantially perform any or all of the functions of user equipment and provide content to user equipment in a format suitable for consumption.

Memory may be an electronic storage device provided as storage 510 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 510 may be used to store various types of content described herein as well as activity data described above. Nonvolatile memory may also be used (e.g., to launch a boot-up routine and other instructions). Cloud-based storage, described in relation to FIG. 7, may be used to supplement storage 510 or instead of storage 510.

Recommendations engine 502 may be part of server-side equipment, connected to client-side equipment using communications network 512 as described herein. In client-server based embodiments, control circuitry 504 may include communications circuitry 508 suitable for communicating with a guidance application server or other networks or client devices. The instructions for carrying out the above-mentioned functionality may be stored on the guidance application server. Communications circuitry 508 may include a cable modem, an integrated services digital network (ISDN) modem, a digital subscriber line (DSL) modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other.

Recommendations engine 502 may be connected to a communications network 512. Communications network 512 may also be connected to, for example, servers, devices, and other user equipment. Communications network 512 may be one or more networks including the Internet, a mobile phone network, mobile voice or data network (e.g., a 5G, 4G or LTE network), mesh network, peer-to-peer network, cable network, cable reception (e.g., coaxial), microwave link, DSL reception, cable internet reception, fiber reception, over-the-air infrastructure, optical wireless communications (e.g. Li-Fi), or other types of communications network or combinations of communications networks. The recommendations engine may be coupled to a secondary communication network (e.g., Bluetooth, Bluetooth Low Energy, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

Recommendations engine 502 may receive and transmit content and data via input/output (I/O) path 514. I/O path 514 may provide content (e.g., broadcast programming, on-demand programming, Internet content, content available over a local area network (LAN) or wide area network (WAN), and/or other content) and data to recommendations engine 502. Control circuitry 504 may be used or cause to send and receive commands, requests, and other suitable data using I/O path 514. I/O path 514 may connect any of control circuitry 504, processing circuitry 506, communications circuitry 508, and storage 510 to one or more communications paths. I/O functions may be provided by one or more of these communications paths, but are shown as a single path in FIG. 5 to avoid overcomplicating the drawing.

Figure 6:
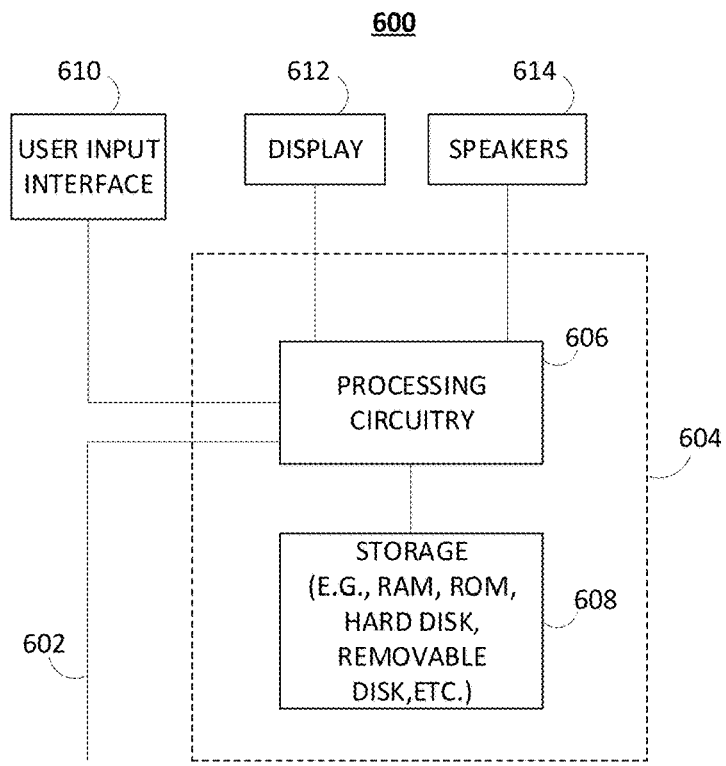
FIG. 6 shows an illustrative block diagram of a user equipment device, in accordance with some embodiments of the disclosure.

FIG. 6 is an illustrative block diagram showing exemplary user equipment 600, in accordance with some embodiments of the disclosure. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing. In some embodiments, a cloud entertainment service system (e.g. a cloud gaming console) may substantially perform any or all of the functions of user equipment described herein and provide content to remote user equipment in a format suitable for consumption.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). A media guidance application may include or be a recommendations engine. Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other.

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Media guidance data may include or be content consumption data. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
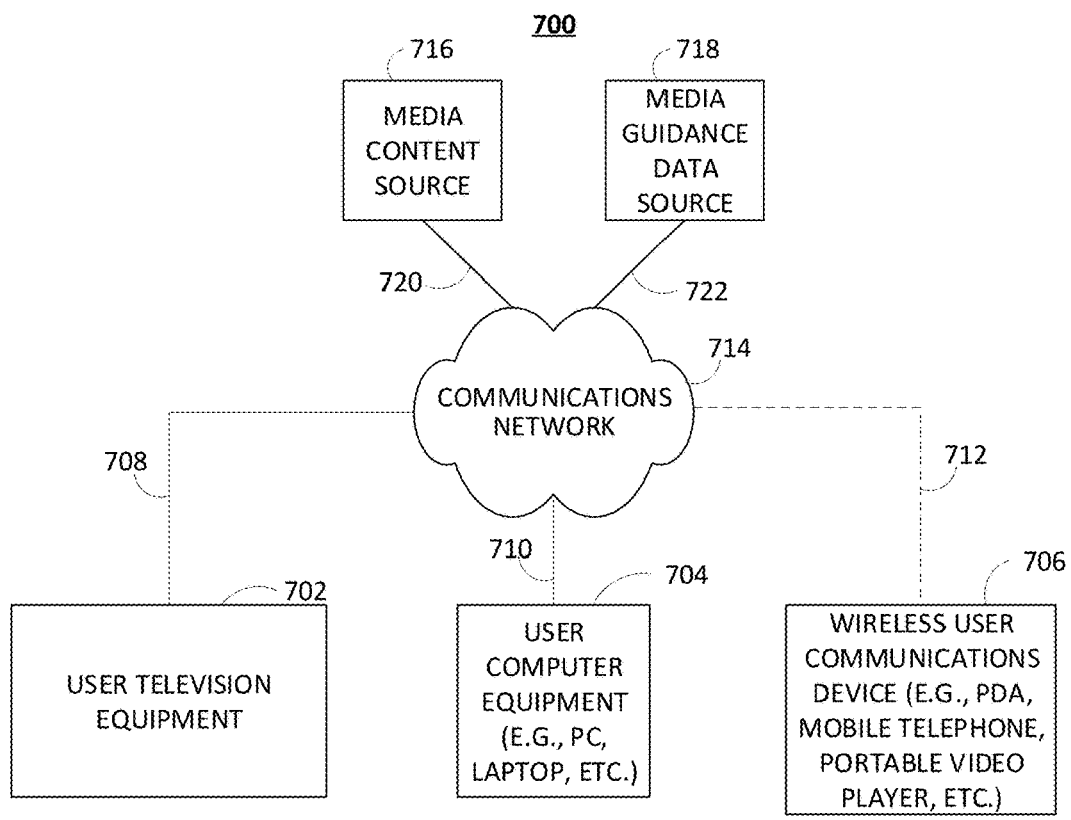
FIG. 7 shows an illustrative block diagram of a media system, in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device. For example, user equipment may include an infotainment console in a vehicle. For example, user equipment may include a virtual reality (VR) device, an augmented reality (AR) device, a mobile phone, and/or a cloud gaming console.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, optical wireless communications network (e.g. Li-Fi), or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, Bluetooth Low Energy, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communication paths but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed (e.g. when the guidance data is out of date or when the user equipment device receives a request from the user to receive data). Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608 and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications (i.e. applications delivered as a service over the Internet) while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6. In such embodiments, user equipment devices may be connected to a cloud entertainment service system (e.g. cloud gaming consoles).

Figure 8:
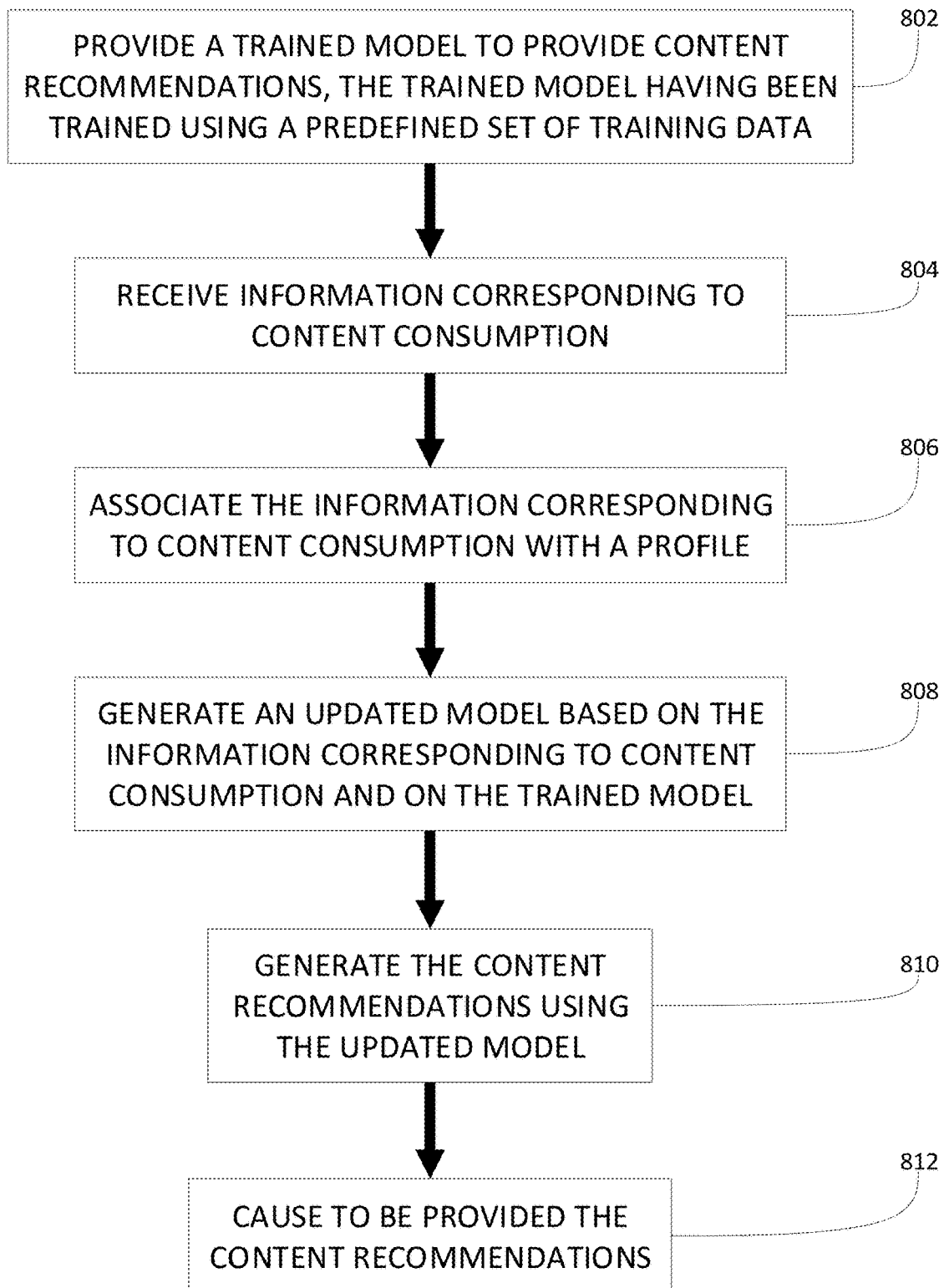
FIG. 8 shows a flowchart of a process for providing content recommendations using a personalized model, in accordance with some embodiments of the disclosure.

FIG. 8 is a flowchart of a process 800 for providing content recommendations using a personalized model, in accordance with some embodiments of the disclosure. Process 800, and any of the following processes, may be executed by control circuitry (e.g. by instructing control circuitry 504 in a recommendations engine 502). The control circuitry may be part of a recommendations engine (e.g. recommendations engine 502) or may be part of a remote server separate from the recommendations engine by way of a communications network or distributed over a combination of both. A system (e.g. system 200) may perform process 800 as described herein.

At 802, a trained model (e.g. trained model 206) for generating content recommendations is provided (e.g. by recommendations engine 202). The trained model may have been trained using a predefined set of training data. In some embodiments, the training data may be agnostic to a specific user profile.

At 804, information corresponding to content consumption may be received (e.g. by system 200). The information may be content consumption data. In some embodiments, the information may include content metadata. Content metadata may indicate time, location, content type, and/or content genre of consumed content. The information may also include control activity data. Control activity data may indicate one or more control function selections made while consuming content. In some embodiments, the information may include information corresponding to portions of consumed content. In some embodiments, the information may include content consumption data on a social network. Some examples are shown in FIG. 4 as content consumption data 404 which includes data 406 through 416.

At 806, the information may be associated with a profile (e.g. by recommendations engine 202 and/or a media guidance application). The profile may be associated with a user. For example, the content consumption data may be linked to the profile. In this manner, a system may consider the consumption preferences of a particular profile data. Any content recommendations generated by a system may be associated to the particular profile data.

At 808, an updated model may be generated based on the information corresponding to content consumption and on the provided model (e.g. by recommendations engine 202). The updated model may also be referred to as a personalized model, which is personalized to a user associated with the information corresponding to content consumption. In some embodiments, the personalized model may be a first updated model. In some embodiments, the personalized model may be associated with a profile. For example, the personalized model may be linked to the profile. A system may use the personalized model whenever the linked profile requests content as described at 810.

At 810, content recommendations may be generated using a personalized model (e.g. by recommendations engine 202). The content recommendations may include previously consumed and unconsumed content. The recommendations may be provided at a time when the user may enjoy consuming the content.

At 812, a system may cause to be provided the content recommendations to a user (e.g. executing instructions via control circuitry 504 to transmit to user equipment 214 by communications circuitry 508). In some embodiments, the content recommendations may be a first set of content recommendations as described in FIG. 9.

Figure 9:
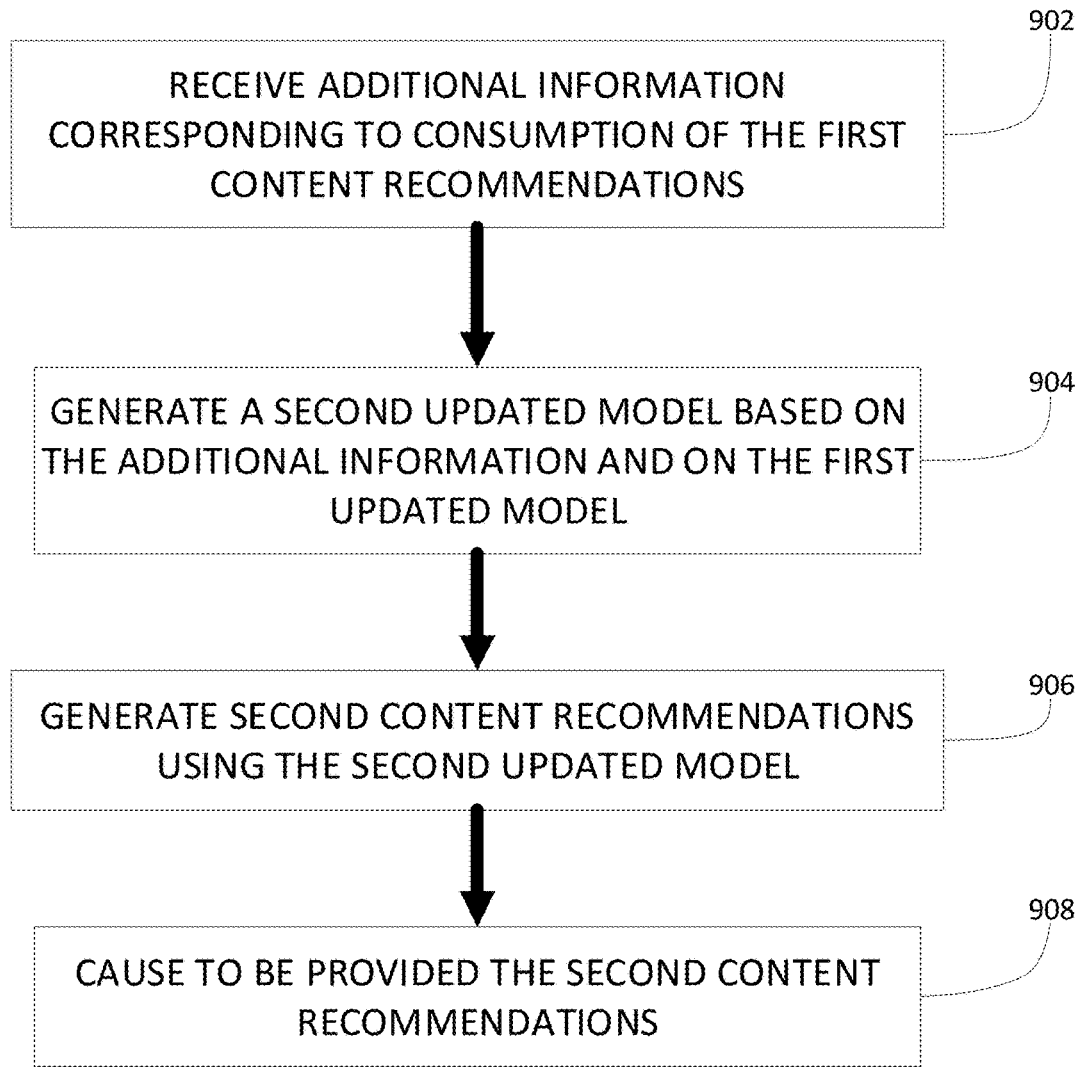
FIG. 9 shows a flowchart of a process for providing content recommendations using an updated personalized model, in accordance with some embodiments of the disclosure.

FIG. 9 is a flowchart of a process 900 for providing content recommendations using an updated personalized model, in accordance with some embodiments of the disclosure. In some embodiments, process 900 may be considered as a continuation of process 800. In some embodiments, at least parts of process 800 and 900 may be considered as part of a feedback loop (e.g. loop 218). A system (e.g. system 300) may perform process 900 as described herein.

At 902, additional information corresponding to content consumption may be received (e.g. by system 300). In some embodiments, the additional information may include activity corresponding to content recommendations provided by user equipment (e.g. user equipment devices 304). Additionally or alternatively, the additional information may include activity corresponding to other content recommendations consumed by a user.

At 904, a second updated model may be generated based on the additional information and on the first updated model. In some embodiments, the second updated model is a personalized model (e.g. updated personalized model 308), which is updated using the additional information corresponding to content consumption. The second updated model may be referred to as a second personalized model and/or an updated personalized model. The personalized model may be updated any number of times and based on any suitable trigger (e.g., periodically, by user request, when the system determines that particular previously unknown preferences of the user are significant enough, etc.). The personalized model may be referred to, herein, as first, second, third, etc. updated personalized model (or personalized model for brevity) based on the number of times the personalized model has been updated.

At 906, the second updated model may be used to generate additional content recommendations. For example, the system may use the second personalized model to generate recommendations similar to any content item in the content consumption data. The additional content recommendations may be a second set of content recommendations (e.g. content recommendations 310). A system (e.g. system 300) may cause to be provided the second content recommendations to user equipment.

Figure 10:
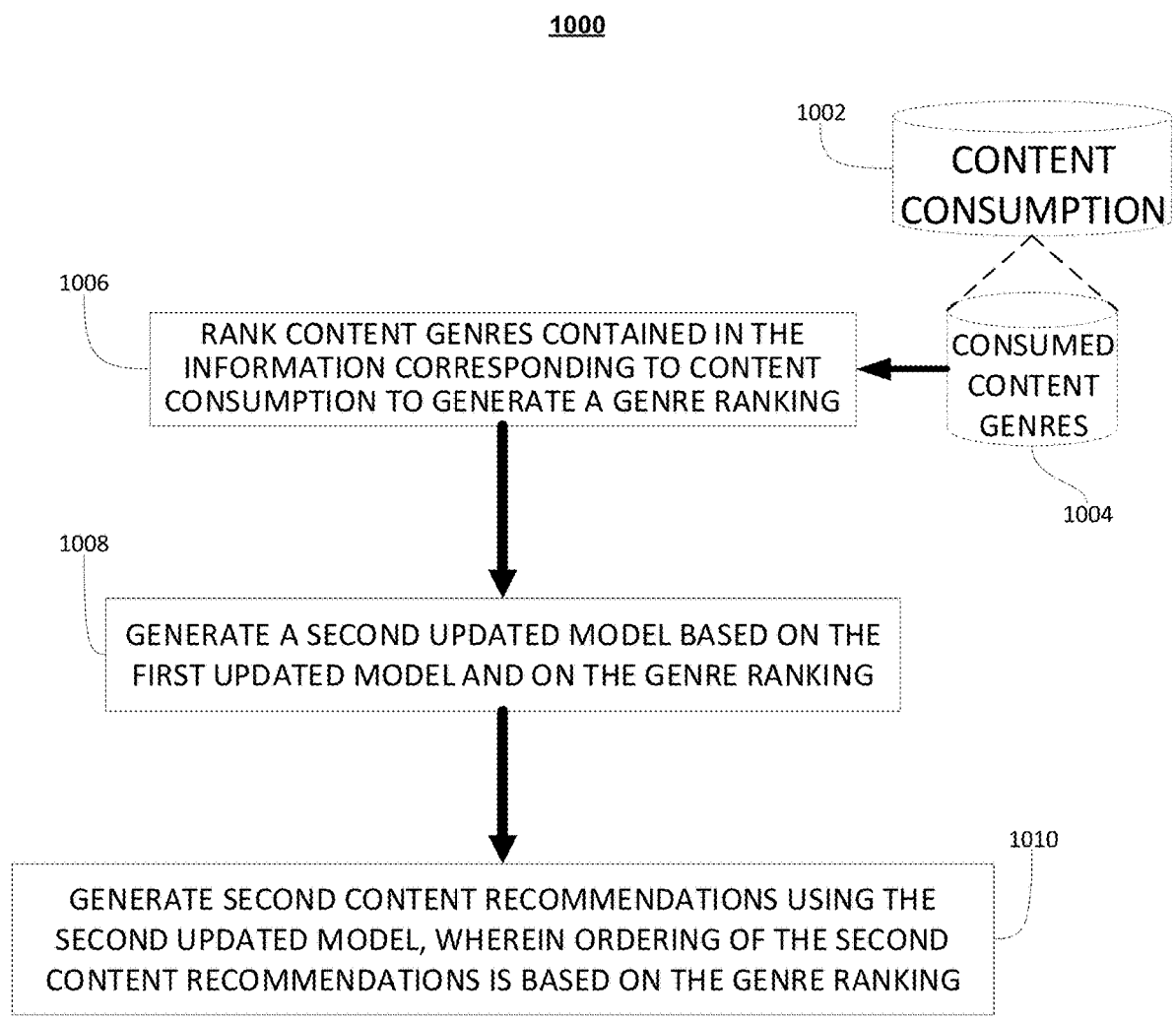
FIG. 10 shows a flowchart of a process for generating a personalized model including a genre ranking, in accordance with some embodiments of the disclosure.

FIG. 10 is a flowchart of a process 1000 for generating a personalized model including a genre ranking, in accordance with some embodiments of the disclosure. Process 1000 may be part of process 900, and/or any other process described in the present disclosure, when generating content recommendations based on content consumption data. Process 1000 may be performed by a system (e.g. system 400, where content consumption data 404 includes data 406-416). For simplicity, the content ranking described in relation to process 1000 herein is based on content genres and/or themes, but it should be noted that the content ranking may be based on one or more criteria of content consumption, including content genres and/or themes.

Content consumption data 1002 may be provided. Content consumption data 1002 may include consumed content genres and/or themes indicated by content metadata (or other data indicative of consumed content genres). Content consumption data 1002 may be indicative of preferred content genres and/or consumed by a user. At 1006, content genres may be ranked based on the content consumption data to generate a content ranking. The genre ranking may order content genres, for example, from most preferred to least preferred content genres. Additionally or alternatively, the genre ranking may order content genres from least preferred to most preferred.

At 1008, a second updated model may be generated based on the personalized model (e.g. personalized model 210) and the genre ranking (e.g. personalized model 402). The second updated model may include updating one or more weights of a first updated model as described in FIG. 11.

At 1010, an ordered set of content recommendations may be generated using the second updated model based on the genre ranking (e.g. ranked content recommendations 420). For example, the ordering of the recommendations may be from most preferred genres to least preferred genres. For example, a system may recommend content such as Lord of the Rings (fantasy), the Tudors (drama), and Spartacus (action). Content consumption data may have indicated a user prefers action over fantasy and fantasy over drama. In this non-limiting example, the system may generate a preferred genre ranking of 1) action, 2) fantasy, and 3) drama. The system may cause to provide the content recommendations in the order of 1) Spartacus, 2) Lord of the Rings, and 3) Tudors.

Figure 11:
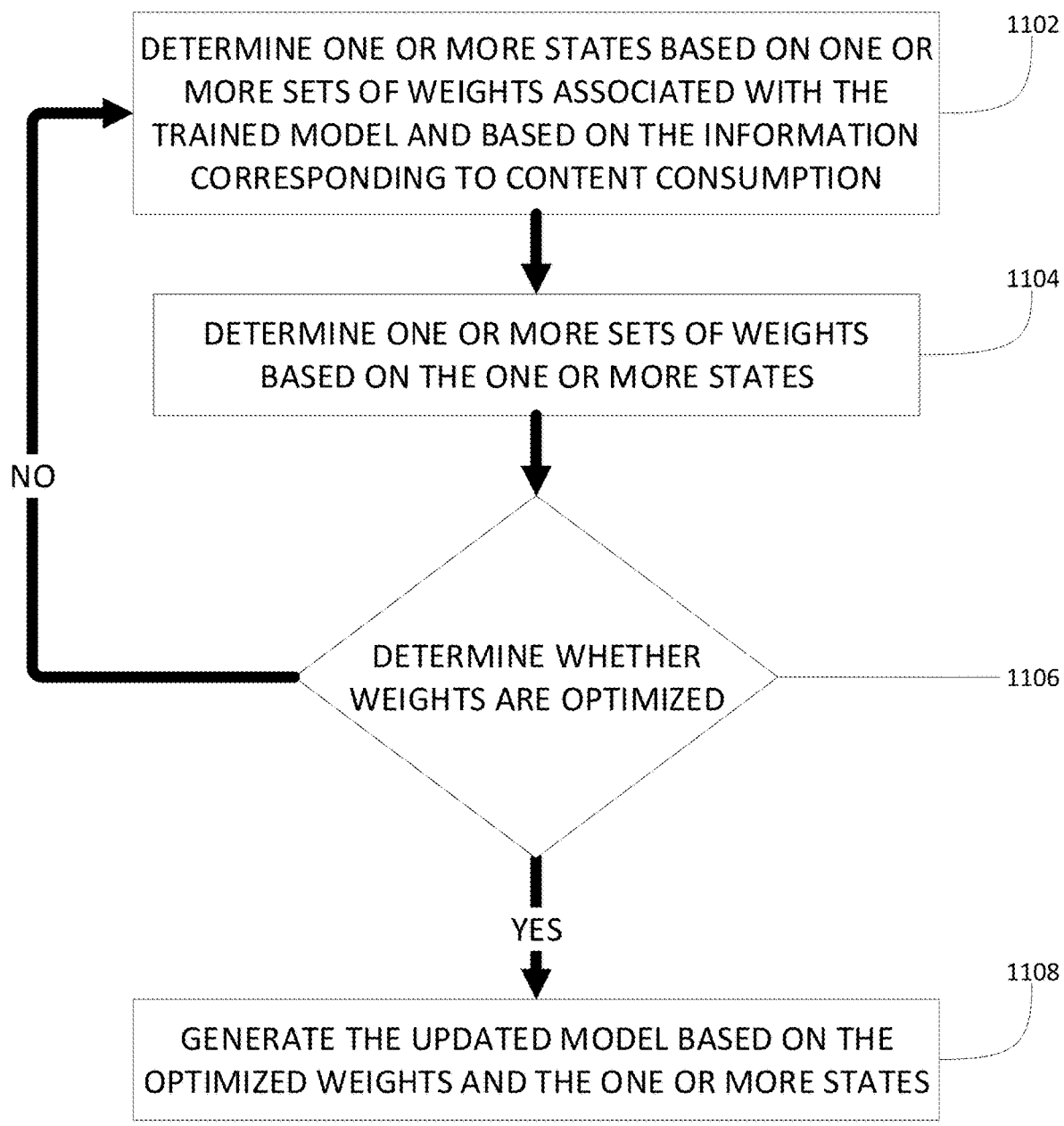
FIG. 11 shows a flowchart of a process for generating a personalized model based on state data and optimized weights, in accordance with some embodiments of the disclosure.

FIG. 11 is a flowchart of a process 1100 for generating a personalized model based on state data and optimized weights, in accordance with some embodiments of the disclosure. Process 1100 may be performed by any system described in the present disclosure involving generating an updated model. Process 1100 may generate the updated model using a long short-term memory recurrent neural network (LSTM RNN) model. For simplicity, process 1100 is described in the context of a LSTM RNN model. It should be noted that process 1100 described herein may be performed by a system using any applicable model including variants of a LSTM RNN model. It should also be noted that, while primarily machine learning techniques are described, any appropriate techniques for computations, optimizations, etc may be used in performing process 1100 as alternative or additional parts of the process.

One skilled in the art may consider a long short-term memory recurrent neural network as a RNN with the inclusion of a cell state (e.g. a state variable stored in memory). The cell state may store content consumption data as numerical data or other representation. The cell state may be used to determine how to update the model based on content consumption data and other input data. The cell state may also be used to determine which weights to update based on content consumption data and other input data. The cell state may also be used to generate updated or optimized weights based on content consumption data and other input data. For example, control function activity while watching Game of Thrones may indicate enjoyment of a particular scene such as an action scene. For example, a user may have replayed the action scene using a remote controller, voice control, or other control device and method. A cell state may have already included data indicative of the user watching Game of Thrones but may not include the replay activity of the particular scene. Then, a system may determine to update the state (or states) corresponding to replay activity of that particular scene.

A model (e.g. a LSTM RNN model) may indicate preferences or other criteria corresponding to content consumption by one or more sets of weights. The weights may represent the preferences or other criteria using numerical data or other formats. The weights may be associated with any of the models described in the present disclosure and based on content consumption data. As indicated, the weights may be determined and/or optimized using machine learning techniques, or any other relevant techniques, such as combining gradient descent and backpropagation. It is preferable that a personalized model is generated based on a set of optimized weights and one or more cell states with respect to the preferences of a user.

At 1102, one or more cell states may be determined based on weights associated with a trained model (or any other model described in the present disclosure) and content consumption data. For example, a user may have replayed the action scene using a remote controller, voice control, or other control device and method. A system may determine to update the states related to replay of an action scene and the associated weights. For example, recommendations engine 202 may determine the cell states based on content consumption data 208 and trained model 206 in order to generate personalized model 210, which may be based on a LSTM RNN model. In some embodiments, a recommendations engine may combine training data, content consumption data, and a trained model in a single step to generate a personalized model.

At 1104, one or more sets of weights may be determined based on the cell states. The weights may be determined based on all or part of the cell states. For example, a system may determine from the cell state to update only some of the weights related to replay of an action scene. Updating the weights may involve machine learning techniques such as gradient descent.

At 1106, a system may determine whether the one or more weights are optimized. It is preferred that one or more weights are optimized with respect to preferences associated with content consumption data. For example, the weights may indicate incorrect predictions in preferred content (i.e. have a high error value). If the weights have high error, a system may determine the weights are not optimized and return to 1102. Optimization techniques such as back propagation may be used to reduce the error in a loop (e.g. loop including 1102, 1104, and 1106) and update the weights and states until the weights are optimized. If the weights are determined to be optimized, process 1100 continues to 1108.

At 1108, an updated model is generated based on the set of optimized weights and the one or more states. In some embodiments, a LSTM RNN model may be generated where the cell states store all the content consumption data and the weights may be used to determine the criteria for content recommendations. In this manner, a recommendations engine may generate content recommendations by determining whether a content item matches the criteria based on the weights.

Figure 12:
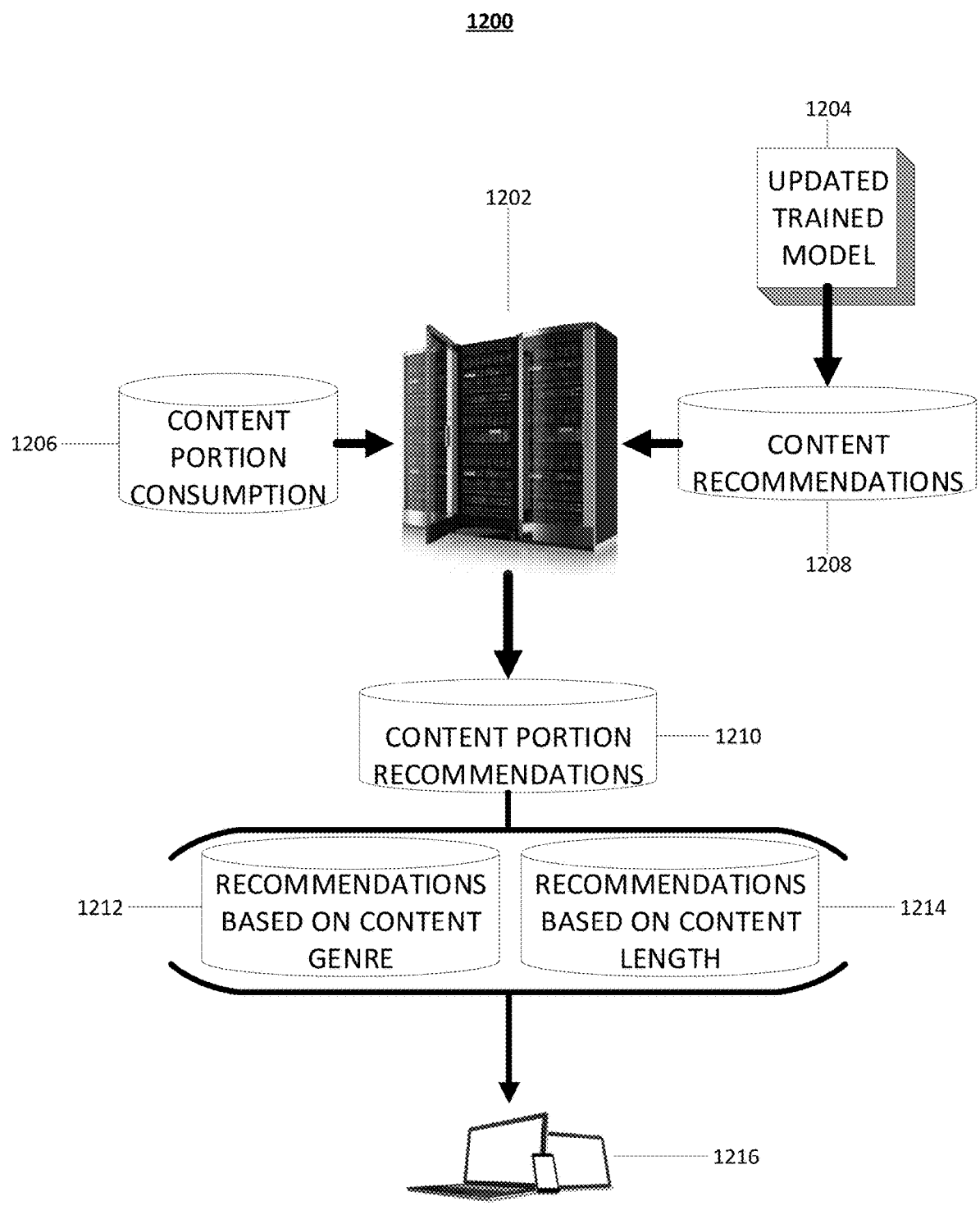
FIG. 12 shows an illustrative block diagram of a system for providing content portion recommendations using a trained model, in accordance with some embodiments of the disclosure.

FIG. 12 shows an illustrative block diagram of a system 1200 for providing content portion recommendations using a trained model, in accordance with some embodiments of the disclosure. System 1200 may provide a trained model 1202. In some embodiments, trained model 1202 may have been updated based on information about content consumption associated with a profile. The information about content consumption may include information about consumption of portions of content items (i.e. content portion consumption data 1204). System 1200 may generate content recommendations using trained model 1202. Additionally or alternatively, system 1200 may generate content portion recommendations 1206 based on the generated content recommendations and on the information about consumption of portions of content items (i.e. content portion consumption data 1204). Content portion recommendations 1206 may include recommendations based on content genre 1208 and/or recommendations based on content item length 1210. System 1200 may provide content portion recommendations 1206 to user equipment 1212. For example, Lord of the Rings may be recommended using any of the models described in the present disclosure based on content consumption data. System 1200 may generate and provide scene recommendations from Lord of the Rings and/or a similar series like Game of Thrones based on the content consumption data.

Figure 13:
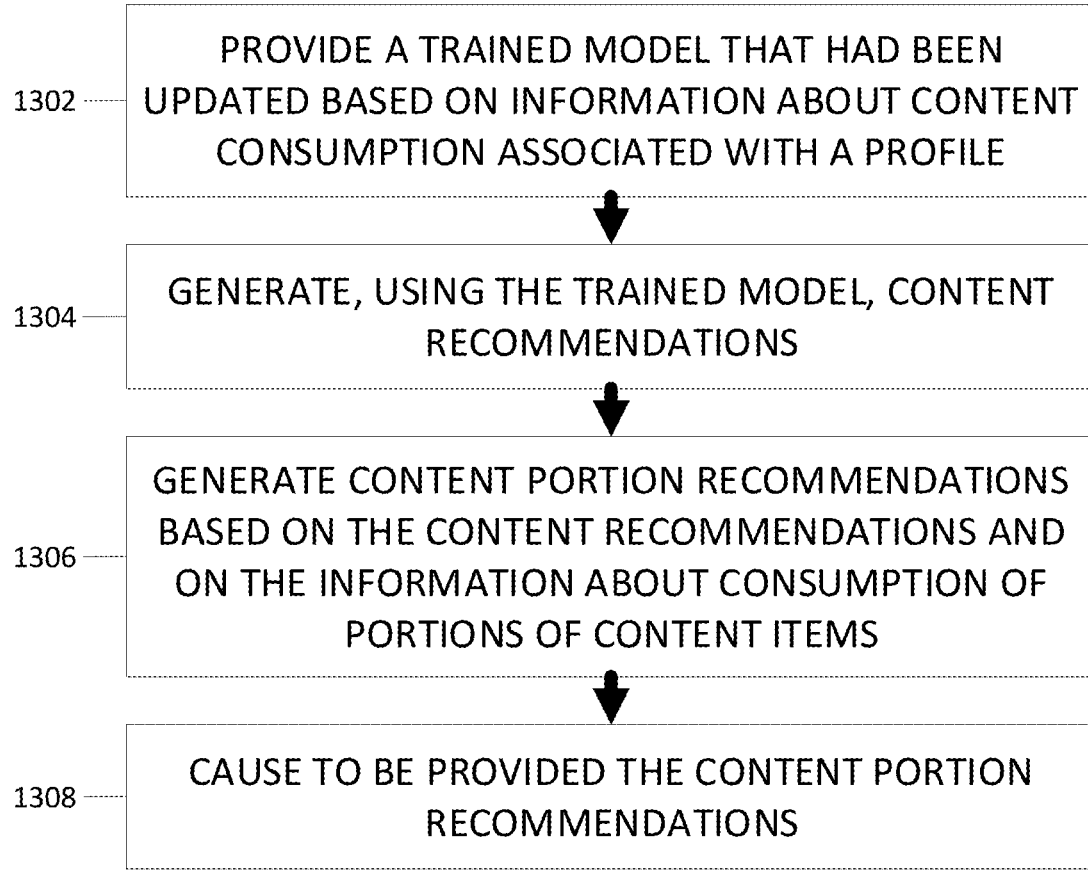
FIG. 13 shows a flowchart of a process for providing content portion recommendations based on content recommendations, in accordance with some embodiments of the disclosure.

FIG. 13 shows a flowchart of a process 1300 for providing content portion recommendations based on content recommendations, in accordance with some embodiments of the disclosure. Process 1300 may be performed by any of the systems (e.g. system 1200) described in the present disclosure.

At 1302, a trained model (e.g. trained model 1202) for generating content recommendations may be provided (e.g. by recommendations engine 202). The trained model may have been updated based on information about content consumption associated with a profile. The information about content consumption may include content portion consumption data 1304. At 1306, the trained model may be used to generate content recommendations. For example, system 200 may generate content recommendations 212. At 1308, a system may generate content portion recommendations based on the content recommendations and on the information about consumption of portions of content items (e.g. content portion consumption data 1304). At 1310, a system may provide or cause to be provided the content portion recommendations. For example, system 1200 may execute instructions via control circuitry to transmit recommendations 1206 to user equipment 1212.

Figure 14:
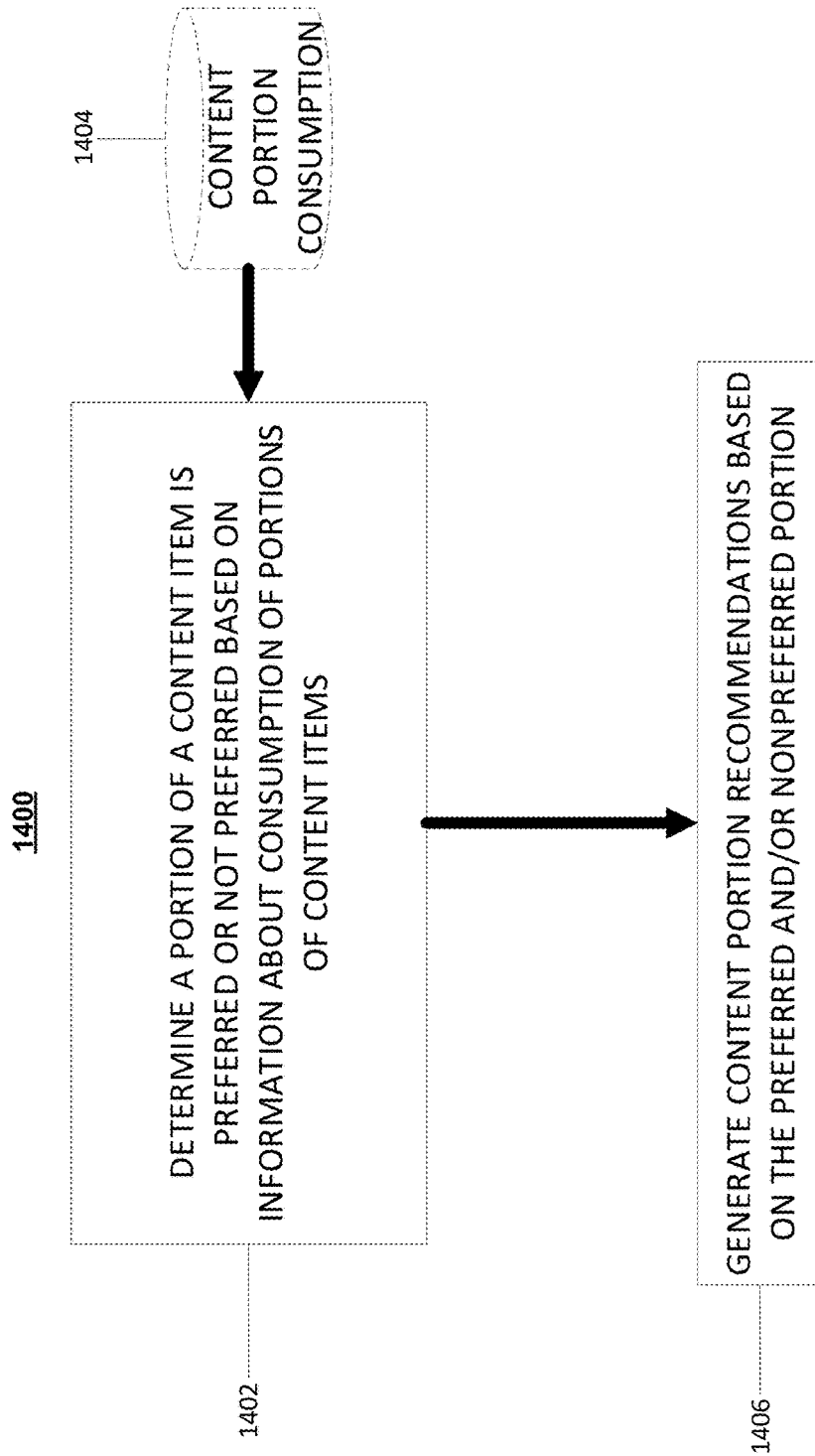
FIG. 14 shows a flowchart of a process for generating content portion recommendations based on one or more preferred and/or nonpreferred portions of a content item, in accordance with some embodiments of the disclosure.

FIG. 14 shows a flowchart of a process 1400 for generating content portion recommendations based on one or more preferred and/or nonpreferred portions of a content item, in accordance with some embodiments of the disclosure Process 1400 may be performed by any of the systems (e.g. system 1200) described in the present disclosure.

At 1402, a preferred portion of a content item may be determined based on information about consumption of portions of content items (i.e. content portion consumption data 1404). For example, a user prefers watching a battle scene from Lord of the Rings based on content portion consumption data 1404. In some embodiments, a system may determine a preferred portion of a content item based on user activity corresponding to the content item. In some embodiments, a system may determine a portion of a content item based on consumption data of one or more content items associated with information about content consumption. The content items may include the content item including the portion and/or other content items. For example, the other content items may be similar to a portion of the content item. A system may identify the portion of the content item based on similarity of other consumed content with the portion of the content item. Determining the similarity may be based on various metrics such as numerical data (e.g. a similarity score), content metadata, or other data indicative of the similarity.

At 1406, content portion recommendations may be generated based on one or more preferred and/or nonpreferred portions of content items. In some embodiments, a consumption preference may be determined based on preferred and/or nonpreferred portions. The consumption preference may be associated with a profile. In some embodiments, a consumption preference may be determined based on consumption activity information associated with a portion. For example, content consumption data 1204 may indicate activity of a scene from Lord of the Rings being watched multiple times. In some embodiments, a consumption preference may be determined based on information about content consumption including content genres, content lengths, time of content consumption, location of content consumption, content type, and/or control function selection made during content consumption. Content consumption preference may include preference of content lengths, time of content consumption, location of content consumption, content type, and/or control function selection made during content consumption.

In some embodiments, a trained or personalized model may be updated based on preferred and/or nonpreferred portions. In some embodiments, a trained or personalized model may be used to generate content portion recommendations based on preferred and/or nonpreferred portions. In some embodiments, the content recommendations and/or content portion modifications may be generated as modified recommendations based on a preferred or a nonpreferred portion.

In some embodiments, a trained model may be provided that has been updated based on information about content consumption associated with a profile. The information about content consumption may include information about consumption of portions of content items. A system may generate content recommendations using the trained model. In some embodiments, the system may generate content portion recommendations based on content recommendations and on information about consumption of portions of content items. The system may provide the content portion recommendations. For example, Lord of the Rings may be recommended using any of the models described in the present disclosure based on content consumption data. A system may generate and provide scene recommendations from Lord of the Rings and/or a similar series like Game of Thrones based on the content consumption data.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of personalizing a model for recommending content, the method comprising:
   accessing a first model for generating content recommendations, the first model trained using a predefined training data set;
   retrieving content consumption information from a user profile, wherein the content consumption information comprises information that was collected subsequent to defining the predefined training data set, wherein the predefined training data set does not include the information that was collected subsequent to defining the predefined training data set;
   generating a second model based on the first model and the content consumption information, wherein generating the second model comprises:
      determining one or more states, starting with a plurality of weights associated with the first model and iteratively updating the plurality of weights based on the content consumption information;
      determining a plurality of optimized weights corresponding to the user profile; and
      generating the second model based on the plurality of optimized weights and on the one or more states; and
   generating, for display and using the second model, the content recommendations.

2. The method of claim 1, wherein the predefined training data set is agnostic of the user profile.

3. The method of claim 1, wherein the content consumption information is a first content consumption information, the method further comprising:
   receiving a second content consumption information comprising information not included in the first content consumption information;
   generating a third model based on the second content consumption information and on the second model; and
   generating, using the third model, second content recommendations.

4. The method of claim 1, wherein the content consumption information comprises activity data collected during content consumption.

5. The method of claim 4, wherein the activity data comprises a control function selection made during content consumption.

6. The method of claim 1, wherein the content consumption information comprises one or more of a time of consumption, a location of consumption, a genre of content consumed, a type of content consumed.

7. The method of claim 6, further comprising:
   ranking content genres in the content consumption information; and
   wherein generating the content recommendations further comprises ordering the content recommendations based on the ranking.

8. The method of claim 1, wherein the content consumption information is based on at least one of full consumption of content, partial consumption of content, or frequency of consumption of content.

9. The method of claim 1, wherein generating the content recommendations comprises generating recommendations comprising one or more portions of a content item using the second model.

10. A system for personalizing a model for recommending content, the system comprising:
    control circuitry configured to access a first model for generating content recommendations, the first model trained using a predefined training data set; and
    communication circuitry configured to retrieve content consumption information from a user profile, wherein the content consumption information comprises information that was collected subsequent to defining the predefined training data set, wherein the predefined training data set does not include the information that was collected subsequent to defining the predefined training data set;
    wherein the control circuitry is further configured to:
       generate a second model based on the first model and the content consumption information, wherein the control circuitry is configured to:
          determine one or more states, starting with a plurality of weights associated with the first model and iteratively updating the plurality of weights based on the content consumption information;
          determine a plurality of optimized weights corresponding to the user profile; and
          generate the second model based on the plurality of optimized weights and on the one or more states; and
       generate, for display and using the second model, the content recommendations.

11. The system of claim 10, wherein the predefined training data set is agnostic of the user profile.

12. The system of claim 10, wherein the content consumption information is a first content consumption information, and wherein the control circuitry is further configured to:
    receive a second content consumption information comprising information not included in the first content consumption information;
    generate a third model based on the second content consumption information and on the second model; and
    generate, using the third model, second content recommendations.

13. The system of claim 10, wherein the content consumption information comprises activity data collected during content consumption.

14. The system of claim 13, wherein the activity data comprises a control function selection made during content consumption.

15. The system of claim 10, wherein the content consumption information comprises one or more of a time of consumption, a location of consumption, a genre of content consumed, a type of content consumed.

16. The system of claim 15, wherein the control circuitry is further configured to:
- rank content genres in the content consumption information; and
- order the content recommendations based on the ranking.

17. The system of claim 10, wherein the content consumption information is based on at least one of full consumption of content, partial consumption of content, or frequency of consumption of content.

18. The system of claim 10, wherein the control circuitry is configured to generate recommendations comprising one or more portions of a content item using the second model.

\* \* \* \* \*